(12) United States Patent
Ohtomo et al.

(10) Patent No.: US 7,726,033 B2
(45) Date of Patent: Jun. 1, 2010

(54) MULTI-POINT MEASURING METHOD AND SURVEYING DEVICE

(75) Inventors: Fumio Ohtomo, Itabashi-ku (JP); Hitoshi Otani, Itabashi-ku (JP); Junki Kaneko, Itabashi-ku (JP); Tetsuji Anai, Itabashi-ku (JP); Terukazu Nagashima, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 12/309,060

(22) PCT Filed: Apr. 18, 2008

(86) PCT No.: PCT/JP2008/057994

§ 371 (c)(1),
(2), (4) Date: Jan. 5, 2009

(87) PCT Pub. No.: WO2008/133315

PCT Pub. Date: Nov. 6, 2008

(65) Prior Publication Data

US 2009/0241358 A1 Oct. 1, 2009

(30) Foreign Application Priority Data

Apr. 20, 2007 (JP) .............................. 2007-111896

(51) Int. Cl.
*G01C 3/04* (2006.01)
*G06K 9/00* (2006.01)
(52) U.S. Cl. .......................... 33/275 R; 33/286; 33/290
(58) Field of Classification Search ............... 33/275 R, 33/281–284, 286, 290, 291, 227, 228, 333, 33/DIG. 21, 1 CC; 356/4.01, 4.03, 141.1; 382/100
See application file for complete search history.

(56) References Cited

U.S. PATENT DOCUMENTS 6,473,166 B1 * 10/2002 Ohishi et al. .............. 356/141.1

(Continued)

FOREIGN PATENT DOCUMENTS

JP 10-019562 1/1998

(Continued)

OTHER PUBLICATIONS

The International Search Report dated Jul. 1, 2008.

*Primary Examiner*—Yaritza Guadalupe-McCall
(74) *Attorney, Agent, or Firm*—Nields, Lemack & Frame, LLC

(57) ABSTRACT

There are provided a telescope unit (5) having a first image pickup unit for acquiring a wide-angle image and a second image pickup unit for acquiring a telescopic image with higher magnification than the wide-angle image, a distance measuring unit for performing distance measurement by projecting a distance measuring light and by receiving a light reflected from an object to be measured, an angle measuring unit for detecting a horizontal angle and a vertical angle of the telescope unit, a drive unit for rotating and driving the telescope unit in a horizontal direction and in a vertical direction, and a control device for controlling image pickup of the first image pickup unit and the second image pickup unit and for controlling the drive unit based on the results of detection from the angle measuring unit, wherein the control device synthesizes a panoramic image by connecting the wide-angle image obtained by the first image pickup unit, sets up a scheduled measuring point by edge processing of the wide-angle image, and extracts the measuring point corresponding to the scheduled measuring points in the telescopic image by scanning the scheduled measuring point and acquiring the telescopic image by the second image pickup unit with respect to scheduled measuring points, and distance measurement is performed on the measuring point.

16 Claims, 10 Drawing Sheets

U.S. PATENT DOCUMENTS

| | | | |
|---|---|---|---|
| 6,859,269 B2 | 2/2005 | Ohtomo et al. | 356/141.1 |
| 7,196,302 B2 * | 3/2007 | Ohtomo et al. | 250/206.2 |
| 7,319,511 B2 | 1/2008 | Murai et al. | 356/4.03 |
| 7,345,748 B2 * | 3/2008 | Sugiura et al. | 356/139.04 |
| 7,552,025 B2 * | 6/2009 | Ohtomo et al. | 702/150 |
| 2005/0195384 A1 | 9/2005 | Ohtomo et al. | 356/4.05 |
| 2006/0017938 A1 * | 1/2006 | Ohtomo et al. | 356/611 |
| 2007/0107240 A1 * | 5/2007 | Piekutowski | 33/286 |
| 2008/0075326 A1 | 3/2008 | Otani et al. | 382/106 |
| 2009/0235543 A1 * | 9/2009 | Hayashi et al. | 33/293 |

FOREIGN PATENT DOCUMENTS

| | | |
|---|---|---|
| JP | 2000-509150 | 7/2000 |
| JP | 2002-202126 | 7/2002 |
| JP | 2003-279351 | 10/2003 |
| JP | 2004-163292 | 6/2004 |
| JP | 2004-333211 | 11/2004 |
| JP | 2005-249715 | 9/2005 |
| JP | 2008-082707 | 4/2008 |
| WO | 97/40342 | 10/1997 |

* cited by examiner

MULTI-POINT MEASURING METHOD AND SURVEYING DEVICE

FIELD OF THE INVENTION

The present invention relates to a multi-point measuring method and a surveying device, which enable measurement of a multiple of points on an object in wide range.

BACKGROUND ART

In the past, the so-called non-prism measuring instrument has been known, in which a pulsed laser beam is projected for scanning an object to be measured and a distance measurement is performed based on a light reflected from the object to be measured, and three-dimensional measurement is performed on the object to be measured based on the value of the measured distance thus obtained and based on an elevation angle and a horizontal angle at a measuring point. In recent years, there has been a three-dimensional measuring instrument called a laser scanner in which measurement on a multiple of points can be performed at high speed.

The non-prism measuring instrument can perform measurement for long distance with high measurement accuracy and can measure reliably on the object to be measured. However, the measurement is performed by manual operation for each point, and much time is required to measure a multiple of points on rock, face of slope, etc. and to acquire planar data. Also, measurement operators need to check each time for omission or duplication of measurement at the measuring site. In order for the control, it has been practiced to obtain hard copies of an image of the object to be measured taken by a digital camera or the like and to put marks on the measured positions during observation.

In the measurement using the laser scanner, detailed and planar three-dimensional data of the object to be measured can be acquired within short time. However, in normal cases, the final results needed in the fields of the operation of measurement in civil engineering or instrumentation are drawings, and only the data of specific portions such as a corner, a contour, etc. of the object to be measured are needed. Therefore, in the data processing after measurement, in order to extract the measurement data of the portions needed for the preparation of drawings from vast amount of point group data, there are such problems that much time is required and it is necessary to record and control a large amount of data. Further, most of the laser scanners can carry out measurement for only up to several hundreds of meters. The measurement for long distance is difficult to carry out, and also, there are such problems that noise or point density during the scanning are not uniform.

Under the above circumstances, it is an object of the present invention to provide a surveying device, by which it is possible to perform measurement on a multiple of points with high accuracy and with high efficiency, and to simply and easily perform data processing and control after the measurement.

DISCLOSURE OF THE INVENTION

The present invention provides a multi-point measuring method, which comprises a step of acquiring an image including an object to be measured, a step of extracting feature points on the object to be measured through processing of the image and of setting a scheduled measuring point, a step of acquiring a telescopic image on the scheduled measuring point by scanning over the scheduled measuring point, a step of extracting a point corresponding to the scheduled measuring point as a measuring point as a measuring point from the telescopic image, and a step of performing distance measurement on the measuring point. Also, the present invention provides the multi-point measuring method, wherein the step of acquiring an image including an object to be measured is a step of acquiring a panoramic image of wide range including the object to be measured. Further, the present invention provides the multi-point measuring method, wherein there are provided a step of setting up a provisional measurement range including an object to be measured, a step of dividing the provisional measurement range and acquiring images by a wide-angle image with wider angle than the telescopic image, and a step of acquiring the panoramic image through synthesis of the wide-angle images. Also, the present invention provides the multi-point measuring method, wherein the scheduled measuring point is obtained by edge processing. Further, the present invention provides the multi-point measuring method, wherein density of the scheduled measuring point is selected by setting a threshold in edge processing. Also, the present invention provides the multi-point measuring method, wherein density of the scheduled measuring point is selected by designating a distance between feature points in edge processing. Further, the present invention provides the multi-point measuring method, wherein edge processing is performed to the wide-angle image or to a telescopic image, and there is included a step of superimposing the feature points obtained in edge processing on the panoramic image. Also, the present invention provides the multi-point measuring method, wherein a step of setting up a main measurement range by connecting outermost contours of the object to be measured based on the feature points. Further, the present invention provides the multi-point measuring method, wherein scanning on the scheduled measuring point is performed for the main measurement range. Also, the present invention provides the multi-point measuring method, wherein the distance measurement is an averaged distance measurement obtained through operations at determined times at a same measuring point. Further, the present invention provides the multi-point measuring method, wherein the measuring point which has been measured is displayed on the image.

Also, the present invention provides a surveying device, which comprises a telescope unit having a first image pickup unit for acquiring a wide-angle image and a second image pickup unit for acquiring a telescopic image with higher magnification than the wide-angle image, a distance measuring unit for performing distance measurement by projecting a distance measuring light and by receiving a light reflected from an object to be measured, an angle measuring unit for detecting a horizontal angle and a vertical angle of the telescope unit, a drive unit for rotating and driving the telescope unit in a horizontal direction and in a vertical direction, and a control device for controlling image pickup of the first image pickup unit and the second image pickup unit and for controlling the drive unit based on the results of detection from the angle measuring unit, wherein the control device synthesizes a panoramic image by connecting the wide-angle image obtained by the first image pickup unit, sets up a scheduled measuring point by edge processing of the wide-angle image, and extracts a measuring point corresponding to the scheduled measuring point in the telescopic image by scanning the scheduled measuring point and acquiring the telescopic image by the second image pickup unit with respect to scheduled measuring point, and distance measurement is performed on the measuring point. Further, the present invention provides the surveying device, wherein the control device calculates a horizontal angle and a vertical angle of the measuring point and acquires three-dimensional data of the measuring point. Also, the present invention provides the surveying device, wherein a rectangular provisional measurement range which has a diagonal line where two points are provided is set up by directing said telescope unit to the two separated points. Further, the present invention provides the surveying device, wherein the control device sets up a main measurement range by connecting outermost contours of the object to be measured based on feature points in the provisional measurement range and controls the drive unit so that the main measurement range is scanned. Also, the present invention provides the surveying device, wherein the distance measuring unit performs distance measurement as required times on a same measuring point and an average value is regarded as the results of distance measurement.

BEST MODE FOR CARRYING OUT THE INVENTION

Figure 1:
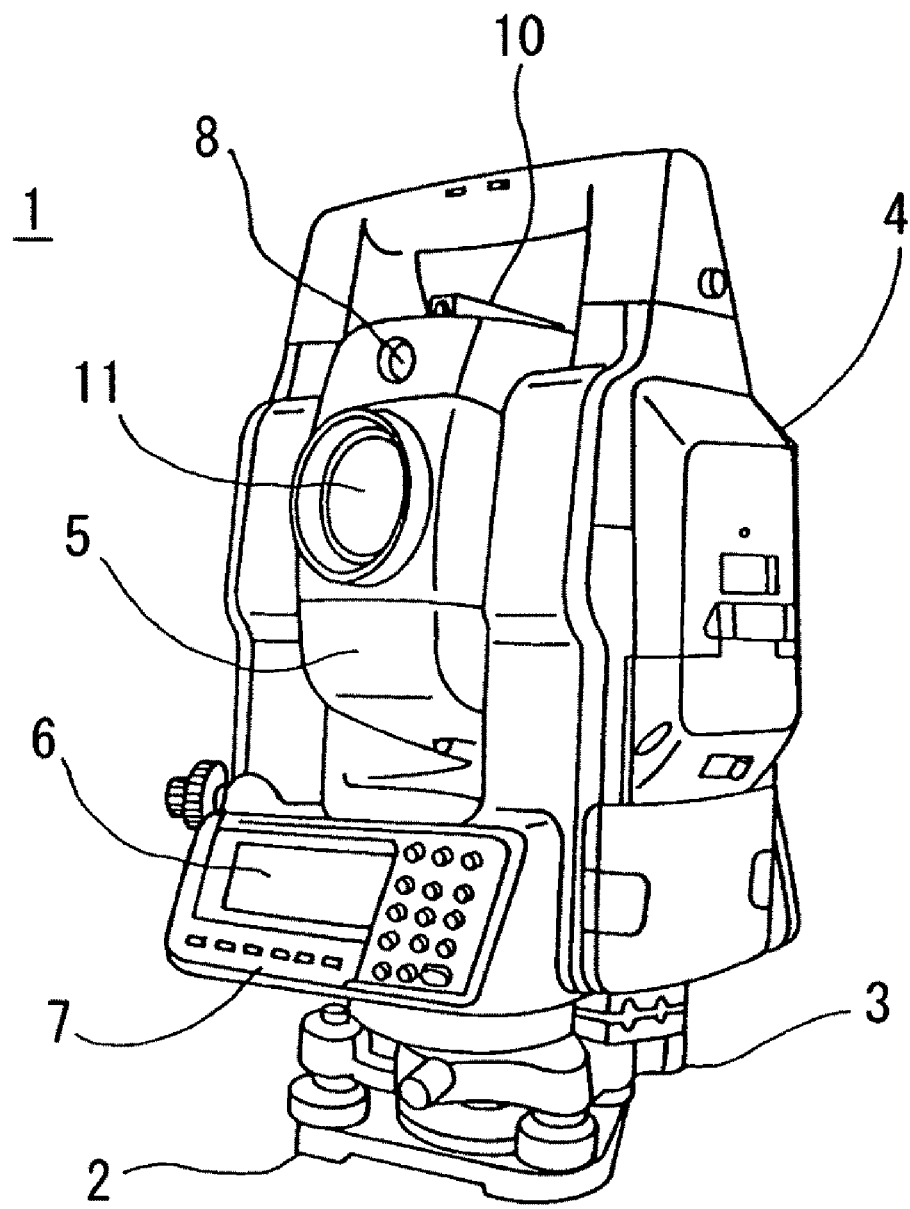
FIG. 1 is a perspective view of an example of a surveying device, in which the present invention is carried out.

Detailed description will be given below on the best mode for carrying out the present invention by referring to the drawings.

FIG. 1 shows a surveying device 1, to which the present invention is applied. The surveying device 1 in use is a total station, for instance, in which a pulsed laser beam is projected to a measuring point. The pulsed light reflected from the measuring point, and a distance is measured for each pulse. The results of the distance measurement are averaged, and the distance can be measured with high accuracy.

The surveying device primarily comprises a leveling unit 2 to be mounted on a tripod (not shown), a base unit 3 to be attached to the leveling unit 2, a frame unit 4 attached on the base unit 3 so as to be rotated around a vertical axis, and a telescope unit 5 attached on the frame unit 4 so as to be rotated around a horizontal axis. A sight 10 for setting approximate collimating direction of the surveying device 1 is mounted on the surveying device 1.

The frame unit 4 comprises a display unit 6 and an operation input unit 7. The telescope unit 5 comprises a second telescope 11 for collimating an object to be measured and a second image pickup unit 12 (to be described later) for acquiring an image (telescopic image) in a collimating direction via an optical system of the second telescope 11. Further, there are provided a first telescope 8 with lower magnification than the second telescope 11 and having visual field of wider range and a first image pickup unit 9 (to be described later) for acquiring an image (wide-angle image) in a collimating direction or in approximately collimating direction via an optical system of the first telescope 8. As the first image pickup unit 9 and the second image pickup unit 12, a digital camera, for instance, is used for outputting the picked-up image as a digital image signal.

A photodetection element incorporated in the first image pickup unit 9 and the second image pickup unit 12 is a CCD or the like, for instance, which is an aggregate of pixels, and a position of each pixel, which receives light, can be specified. Based on the position of the pixel which receives the light, a field angle can be obtained.

Figure 2:
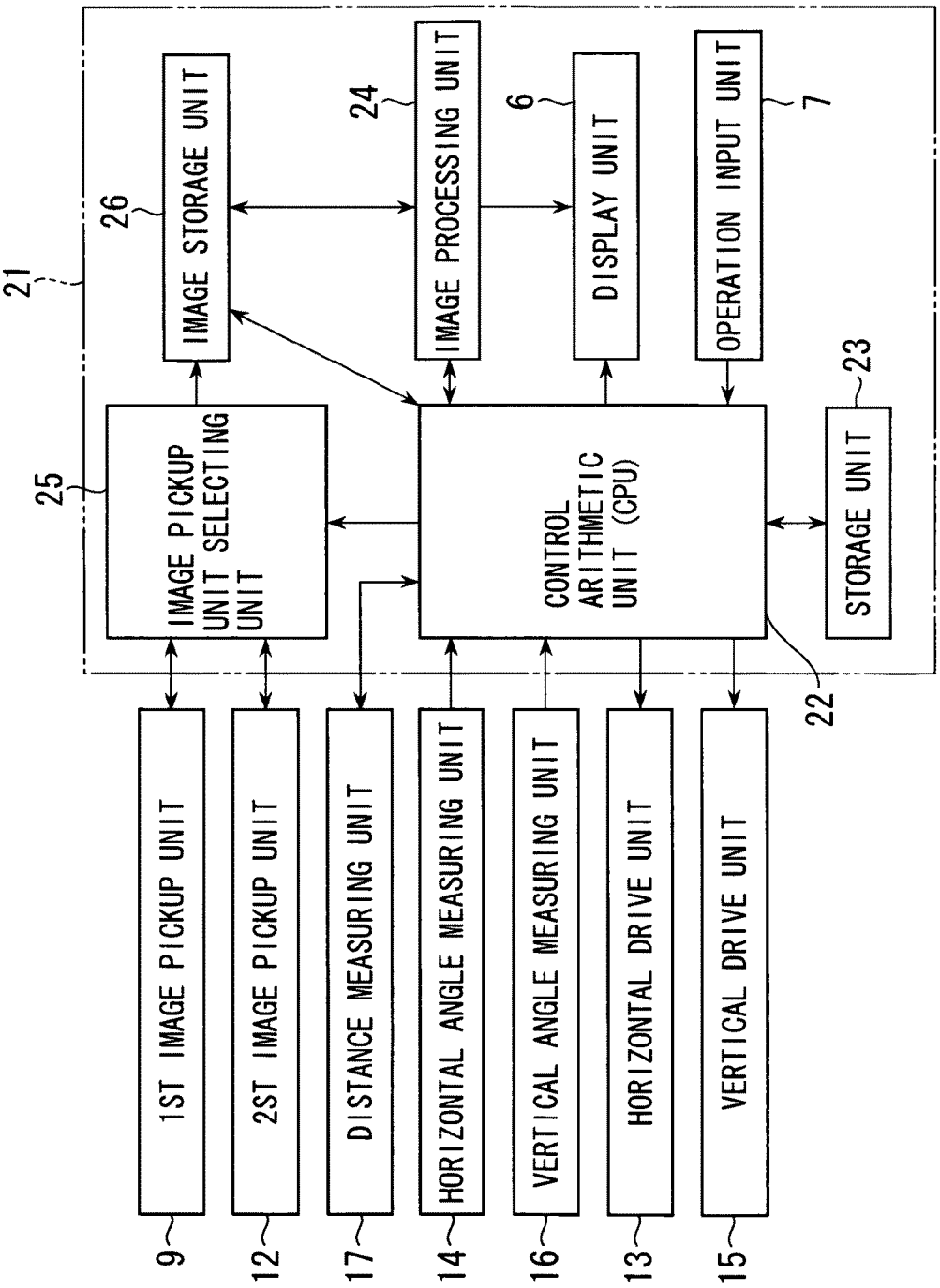
FIG. 2 is a block diagram of the components of the surveying device.

Now, referring to FIG. 2, description will be given on a basic arrangement of the surveying device 1.

The telescope unit 5 incorporates a distance measuring unit 17 which commonly uses the optical system of the second telescope 11. The distance measuring unit 17 projects a distance-measuring light and receives a reflection light from an object to be measured, and performs electro-optical distance measurement to the object to be measured.

On the frame unit 4, a horizontal drive unit 13 is mounted, which rotates the frame unit 4 in a horizontal direction, and a horizontal angle measuring unit 14 is mounted, which detects a horizontal rotation angle of the frame unit 4 with respect to the base unit 3 and which detects a horizontal angle in a collimating direction. Also, on the frame unit 4, a vertical drive unit 15 is mounted, which rotates the telescope unit 5 around the horizontal axis, and a vertical angle measuring unit 16 is mounted, which detects a vertical angle of the telescope unit 5 and measures a vertical angle in a collimating direction.

A control device 21 is incorporated in the frame unit 4. The control device 21 controls the driving of the horizontal drive unit 13 and the driving of the vertical drive unit 15 and rotates the flame unit 4 and the telescope unit 5 so that the telescope unit 5 is directed in a predetermined direction, and a predetermined range is scanned. The switchover among the first telescope 8 and the second telescope 11 is controlled to acquire an image with the magnification as required. Further, the distance measuring unit 17 is controlled to measure a distance to a predetermined measuring point.

The control device 21 comprises a control arithmetic unit 22, a storage unit 23, an image processing unit 24, an image pickup unit selecting unit 25, an image storage unit 26, the display unit 6, the operation input unit 7, etc.

Such programs are stored in the storage unit 23 as; a calculation program required for the measurement, an image processing program for performing image processing as described later, a sequence program selecting measuring points from the processed image and for carrying out distance measurement while scanning over with respect to the selected measuring points, and the like.

The results of measurement from the distance measuring unit 17, the horizontal angle measuring unit 14, and the vertical angle measuring unit 16 are inputted to the control arithmetic unit 22. Also, a distance, an elevation angle and a horizontal angle are measured, and the results of the measurement are stored in the storage unit 23 via the control arithmetic unit 22 and are displayed on the display unit 6.

An image taken by either one of the first image pickup unit 9 or the second image pickup unit 12 selected by the image pickup unit selecting unit 25 is stored in the image storage unit 26 and is displayed on the display unit 6. The image processing unit 24 synthesizes the images stored in the image storage unit 26 (e.g. an image acquired by the first image pickup unit 9) and prepares a composite image for a wider range. The image processing unit 24 by edge processing or the like on the composite image. Then, a contour line and an angle point are detected, and these are stored in the image storage unit 26 and are displayed on the display unit 6.

Figure 3:
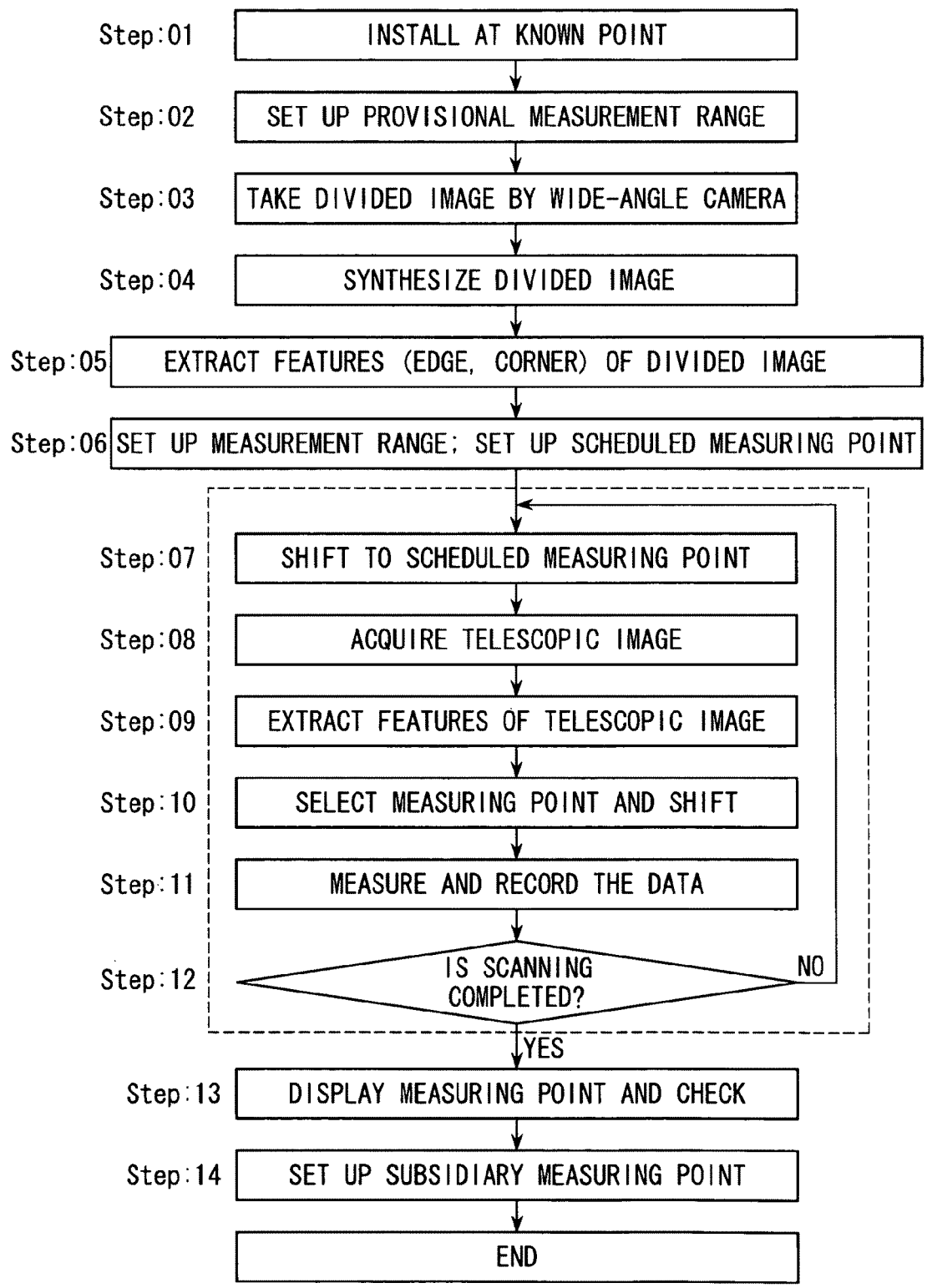
FIG. 3 is a flow chart to show a flow of measurement operation according to the present invention.

Description will be given below on operation of the surveying device of the present invention referring to FIG. 3.

Description will be given bellow on a case where an object to be measured 28 is a summit of a mountain, as an example.

(Step 01) The surveying device 1 is installed at a known point, and the power of the surveying device 1 is turned on. By operating the operation input unit 7, programs necessary for measurement are started and executed.

Figure 4:
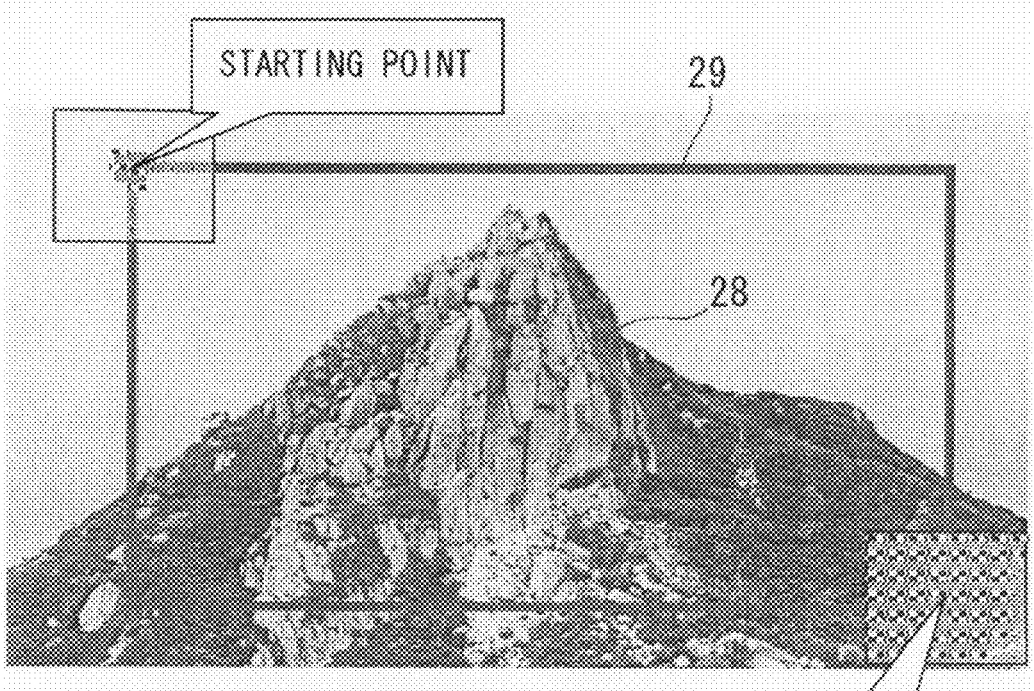
FIG. 4 is an illustration to explain an image corresponding to the flow of measurement.

(Step 02) While performing collimation via the sight 10, the collimating direction of the surveying device 1 is changed, and a starting point and an end point are set by the operation input unit 7. For each of the starting point and the end point, the horizontal angle and the elevation angle are detected by the horizontal angle measuring unit 14 and the vertical angle measuring unit 16, and the results of detection are stored in the storage unit 23. The starting point and the end point are recognized as these are on a diagonal line of a rectangle, and the range of the rectangle with the diagonal line is set up (see FIG. 4). The range of the rectangle thus determined is set up as a provisional measurement range 29.

In the initial stage of the operation, an image taken by the first image pickup unit 9 with wide angle is displayed on the display unit 6. The starting point and the end point may be designated from the screen where the image is displayed by adding a functional element such as a touch panel or the like to the display unit 6.

The provisional measurement range 29 is normally beyond the limit of the image pickup range (image pickup angular field) of the first image pickup unit 9. Based on the provisional measurement range 29 and the image pickup angular field, an aspect of the division for taking image of the provisional measurement range 29 is calculated. Specifically, the number of divisions in a horizontal direction and in a vertical direction and an image center position 32 of each of divided images 30 (position of the optical axis of the first image pickup unit 9) are calculated as a horizontal angle and a vertical angle.

Figure 5:
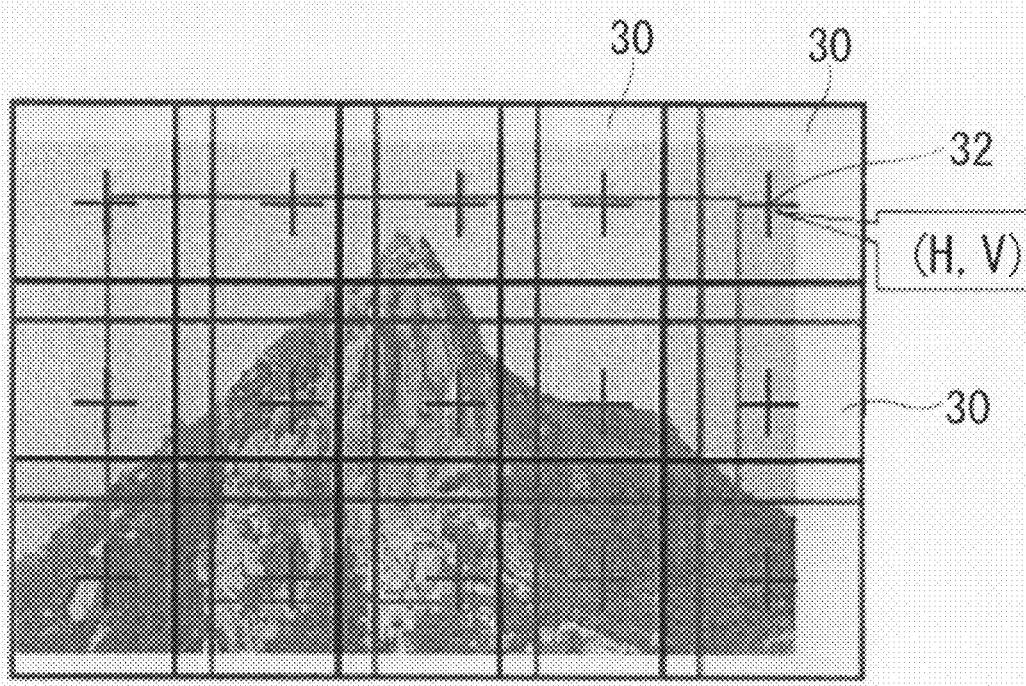
FIG. 5 is an illustration to explain an image corresponding to the flow of measurement.
Figure 6:
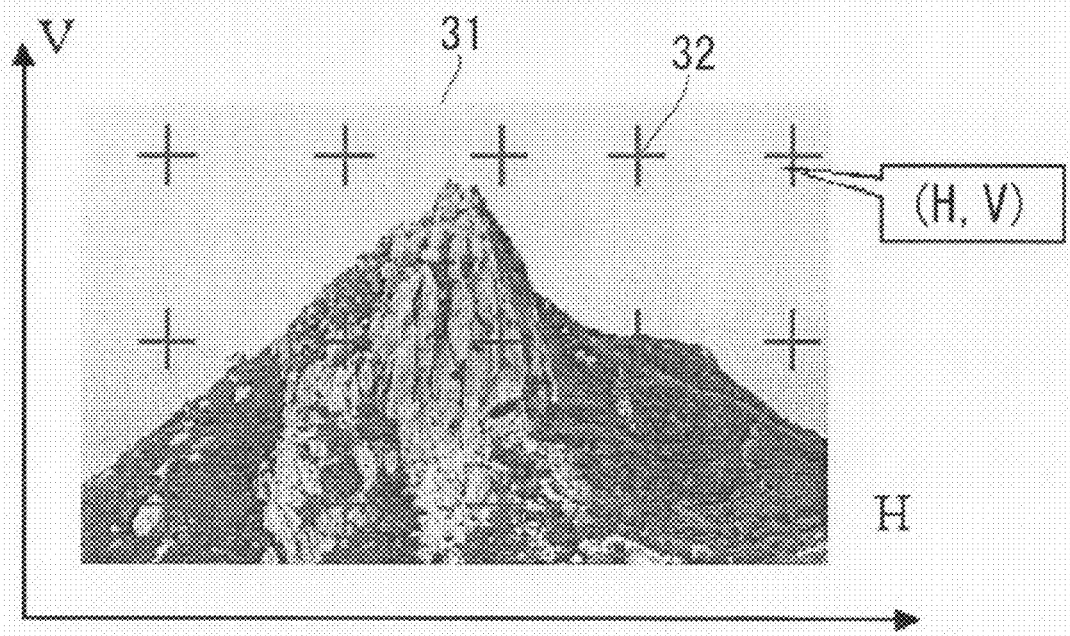
FIG. 6 is an illustration to explain an image corresponding to the flow of measurement.
Figure 7:
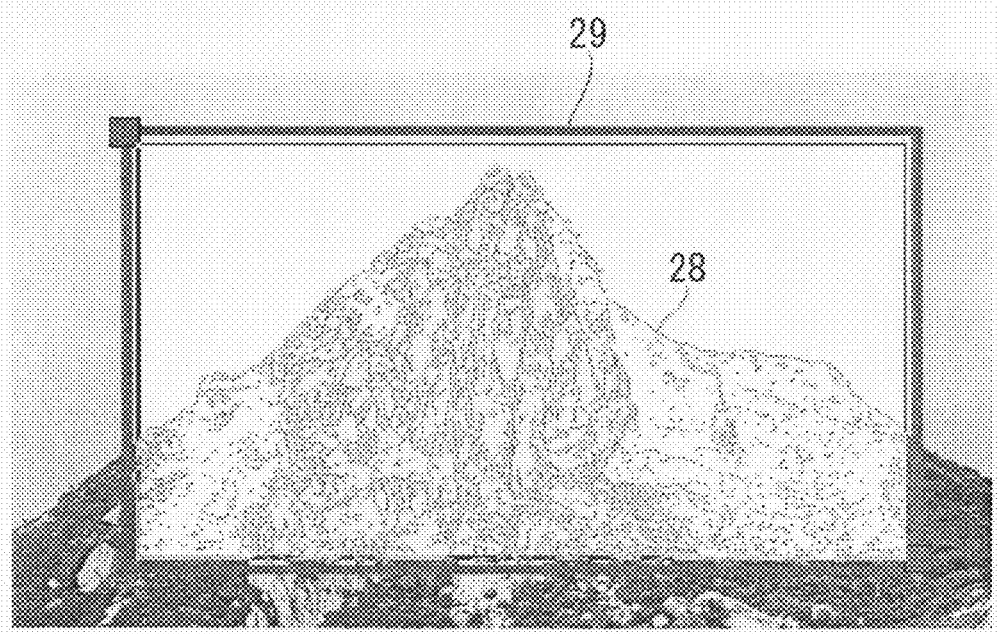
FIG. 7 is an illustration to explain an image corresponding to the flow of measurement.

For the purpose of synthesis, the divided images are set up so as to be overlapped on each other to such an extent as required in a horizontal direction and in a vertical direction (see FIG. 5).

For instance, in the case of that the horizontal angle of the provisional measurement range 29 is 60° and the vertical angle is 30°, and that the angular field of the first image pickup unit 9 is 15, 15 divided images are taken with 5 divisions in a horizontal direction and 3 divisions in a vertical direction (5×3=15) including the overlapped portions. The overlapped portions occupy about 20% of the divided image, and these are used for contrast adjustment when each images are connected.

(Step 3) The horizontal drive unit 13, the vertical drive unit 15, and the first image pickup unit 9 are controlled by the control arithmetic unit 22. At the central position thus calculated, an image is taken by the first image pickup unit 9. The taken images (a wide-angle image) are stored in the image storage unit 26 as the divided images, by being associated with a horizontal angle and a vertical angle (H,V) of the detected central position.

(Step 04) The divided images 30 stored in the image storage unit 26 are read out at the image processing unit 24 and are aligned through positioning based on the horizontal angle and the vertical angle associated with the divided images. One of two adjacent divided images 30 is used as a reference image. According to the density information of the reference image in the overlapped portion, contrast adjustment of the other image is performed for the connection so that the reference image and the other image will have the same contrast. Similarly, all of the divided images 30 are connected, and a panoramic image 31 is composed.

Regarding the image center 32 (position of the optical axis of the first image pickup unit 9) of each of the divided images 30 of the panoramic image 31, the horizontal angle and the elevation angle are obtained from the horizontal angle measuring unit 14 and the vertical angle measuring unit 16. Further, regarding an arbitrary point in each of the divided images 30, the horizontal angle and the elevation angle are obtained by calculating based on the field angle in horizontal and vertical directions in which the image enter position 32 is set as a reference. Therefore, an elevation angle and a horizontal angle at an arbitrary point can be obtained by calculation over the entire area of the panoramic image 31.

(Step 05) Image processing software is started, and image processing such as edge processing and the like is performed on each of the divided images 30, and feature points are extracted. An image the feature points extracted is superimposed on the panoramic image. The feature point is an edge or a corner, for instance. For the detection of the edge, Canny operator is used, for instance, and Haris operator or the like are used for the detection of the corner. The extraction of the feature point may be performed to the provisional measurement range 29 as set up in Step 02 in the panoramic image 31.

Description will be given below on a feature extracting method by using Canny filtering as an example.

In Canny filtering, primary differential is performed after noise removal, and a pixel, which has the maximal value as the result, is considered as the feature (edge). An output value f(x,y) by the Canny filtering can be given by the Equation 1, where the density value of the original image is I(x,y), and Gaussian function is G(x,y):

$$f(x,y)=D[G(x,y)\times I(x,y)]=D[G(x,y)]\times I(x,y) \quad \text{(Equation 1)}$$

Here, $$D[G(x,y)]=[(x^2+y^2)^{1/2}/2\pi\sigma^4]\exp[-(x^2+y^2)/2\sigma^2] \quad \text{(Equation 2)}$$

Edge extraction can be performed by setting two threshold values T1 and T2 as given below.

$$f(x,y)>T1, f(x,y)/2\sigma_0(x,y)>T2 \quad \text{(Equation 3)}$$

Here, $$\sigma_0^2(x,y)=G'(x,y)\times I^2(x,y)-[G'(x,y)\times I(x,y)]^2 \quad \text{(Equation 4)}$$

The threshold values T1 and T2 as given in the equation 3 are referred as a height of the edge and reliability of the edge respectively.

Figure 8:
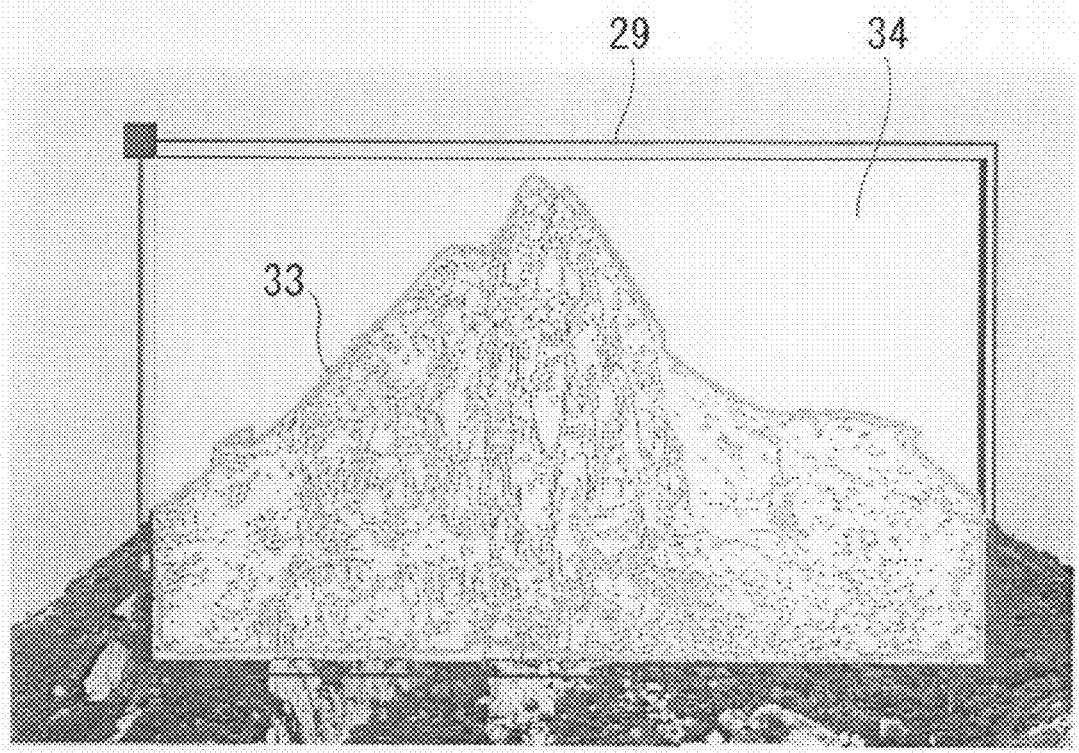
FIG. 8 is an illustration to explain an image corresponding to the flow of measurement.

(Step 06) Feature points included within a range designated by the provisional measurement range 29 are extracted. After the extraction of the features, the outermost contours of the extracted corners are connected, and a main measurement range 33 is automatically set up. The feature points thus extracted and the main measurement range 33 are stored in the image storage unit 26. By setting up the main measurement range 33, a portion not measurable or a portion not suitable for measurement or a portion not measured 34 are excluded (see FIG. 8). After the main measurement range 33 is set up and the feature points are extracted, measurement can be carried out on the feature points within the main measurement range 33.

Figure 9:
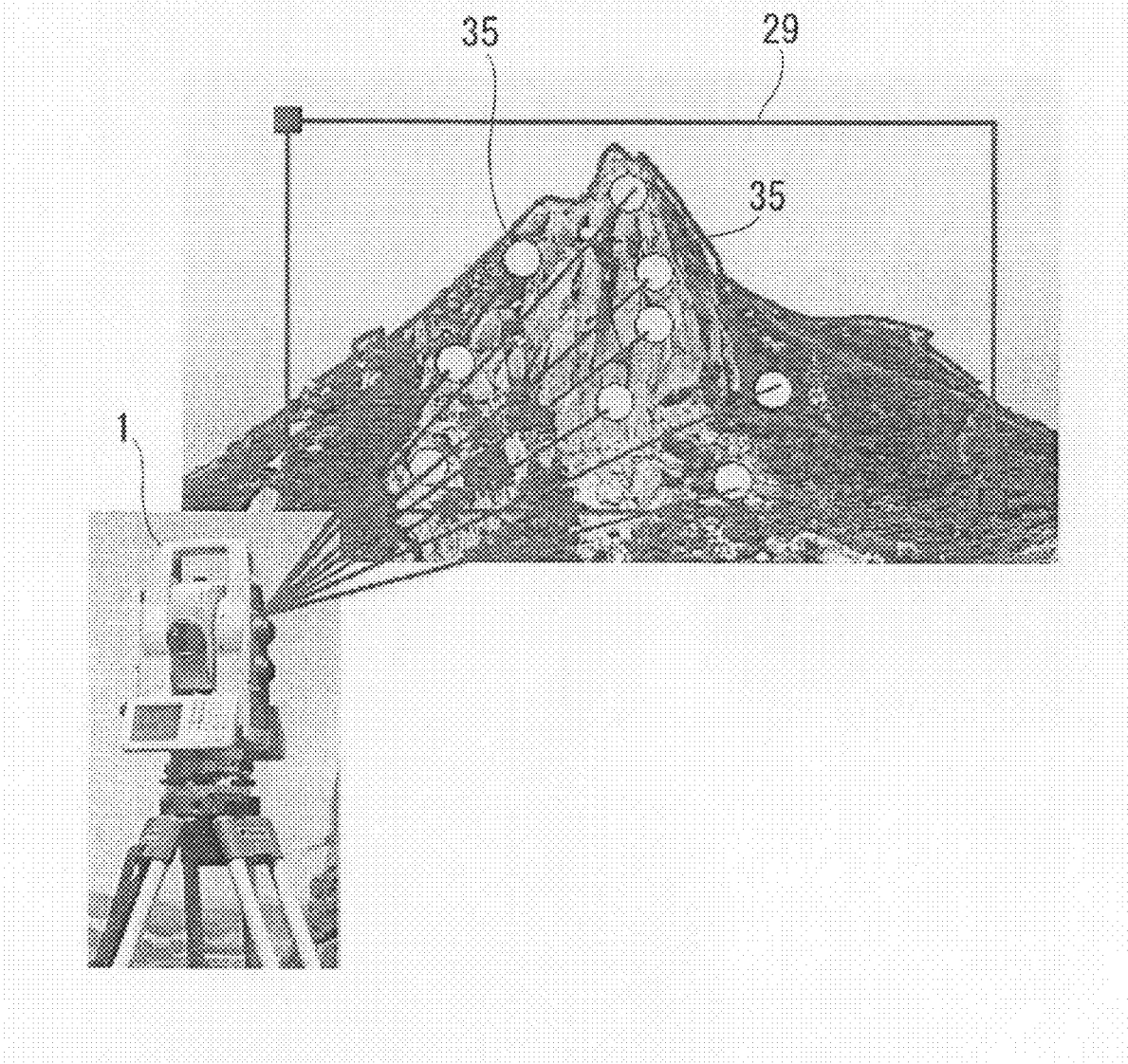
FIG. 9 is an illustration to explain an image corresponding to the flow of measurement.

By designating the threshold value in Equation 3, and the distance between the feature points, extraction density of the feature points can be changed. Therefore, the density of feature points, i.e. the density of the measuring points, can be set up according to the object to be measured, depending on the threshold value and the distance, and only the necessary points can be set up as the measuring points. The feature point obtained by the setting of the threshold value is regarded as a scheduled measuring point 35. For the scheduled measuring point 35, an angular field is calculated according to the position on the panoramic image 31. Further, the horizontal angle and the vertical angle can be calculated according to the angular field. The scheduled measuring point 35 is associated with the horizontal angle and the vertical angle and is stored in the image storage unit 26 (see FIG. 9).

Contrast adjustment or the like of the image may be used as a factor for setting up the density of the measuring points.

(Step 07) When the setting of the main measuring range 33 and the extraction of the scheduled measuring point 35 have been completed, the sequence program for the measurement is started and executed. The control arithmetic unit 22 drives and controls the horizontal drive unit 13 and the vertical drive unit 15, and scanning is performed so that the optical axis of the second image pickup unit 12 is sequentially shifted to the scheduled measuring points 35.

(Step 08) When the optical axis of the second image pickup unit 12 is shifted to the scheduled measuring point 35, switchover to the second image pickup unit 12 is performed by the image pickup unit selecting unit 25. By the second image pickup unit 12, an image is taken with setting the scheduled measuring point 35 as the center, and the image thus picked up is displayed on the display unit 6. When the optical axis is shifted to the scheduled measuring point 35, a distance measurement is performed by the distance measuring unit 17. Based on the result of distance measurement, focusing of the second image pickup unit 12 (i.e. the second telescope 11) is performed. The distance measurement in this case is the measurement of distance for the purpose of performing the focusing of the second telescope 11, and high accuracy is not required.

When the focusing has been completed, a telescopic image is acquired by the second image pickup unit 12 via the second telescope 11.

(Step 09) By the image processing such as edge processing or the like, the feature points in the telescopic image, e.g. corners, are extracted. The results of the edge processing may be superimposed on the panoramic image.

(Step 10) Based on the scheduled measuring point 35 obtained on the panoramic image 31, a corner corresponding to the scheduled measuring point 35 is selected from the corners extracted in the telescopic image. The corner thus selected is regarded as a measuring point.

Figure 10:
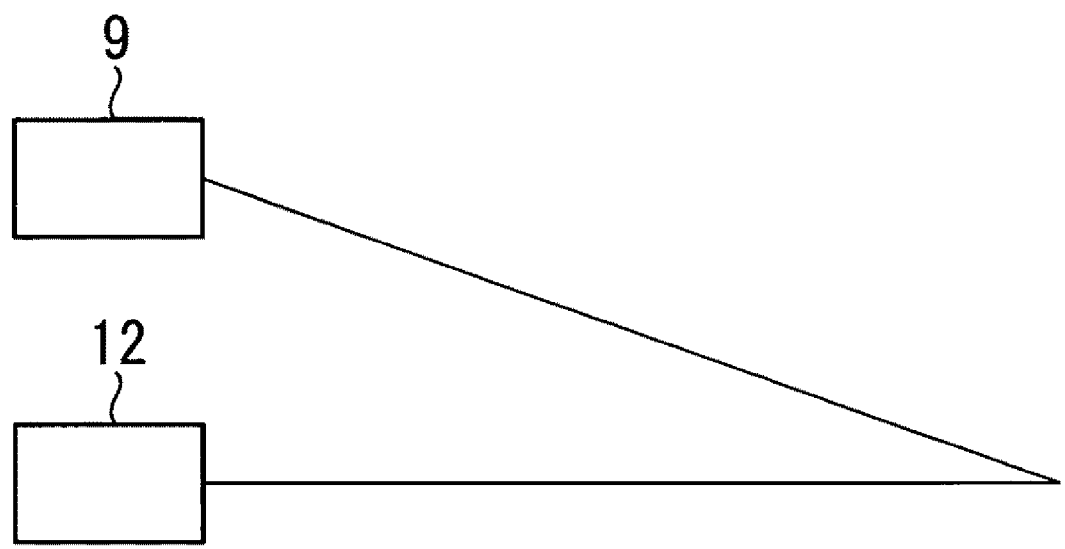
FIG. 10 is a drawing to explain positional relation between a first image-pickup unit and a second image-pickup unit.

In this case, the optical axis of the first image pickup unit 9 (the first telescope 8) does not agree with the optical axis of the second image pickup unit 12 (the second telescope 11) as shown in FIG. 1 and FIG. 10. As a result, if only by the position information obtained at the first image pickup unit 9, deviation may occur on the telescopic image. In order to compensate the deviation, the distance to the object to be measured should be measured, and compensation is made by calculating coordinates of the image obtained by the collinearity condition equation as given below from the distance information obtained. The collinearity condition equation indicates the relation between reference data (X,Y,Z) and the camera.

The position of the first image pickup unit 9 with respect to a mechanical origin of the surveying device 1 is already known. An extent of the deviation of the optical axis of the first image pickup unit 9 at the mechanical origin with respect to the optical axis of the second image pickup unit 12 and tilting of the optical axis of the first image pickup unit 9 with respect to the optical axis of the second image pickup unit 12 are also known, respectively.

The collinearity condition equation can be given below, where:

f: Focal point of the first image pickup unit 9

(x,y): Coordinates in the image of the first image pickup unit 9 (coordinates of image)

(X,Y,Z): Reference point $(X_0,Y_0,Z_0)$ Image-taking position of the first image pickup unit 9

$a_1$-$a_9$: Tilting of the first image pickup unit 9 dx,dy: Calibration correction term of the first image pickup unit 9

$$x = -f\{[a_1(X-X_0)+a_2(Y-Y_0)+a_3(Z-Z_0)]/[a_7(X-X_0)+a_8(Y-Y_0)+a_9(Z-Z_0)]\}+dx$$

$$y = -f\{[a_4(X-X_0)+a_5(Y-Y_0)+a_6(Z-Z_0)]/[a_7(X-X_0)+a_8(Y-Y_0)+a_9(Z-Z_0)]\}+dy \quad \text{(Equation 5)}$$

Further, the following correction equation is used for the calibration correction terms dx, dy.

$$dx = x_0 + x(k_1 r^2 + k_2 r^4 + k_3 r^6 + k_4 r^8) + p_1(r^2+2x^2) + 2p_2 xy$$

$$dy = y_0 + y(k_1 r^2 + k_2 r^4 + k_3 r^6 + k_4 r^8) + p_2(r^2+2y^2) + 2p_1 xy$$

where $x_0, y_0$: Position of the principal point $k_1, k_2, k_3, k_4$: Coefficients relating to distortion aberration in radial direction $p_1, p_2$: Coefficients relating to distortion aberration in tangential direction $r = \sqrt{(x^2+y^2)}$: Distance from the principal point $(x_0, y_0)$ In the case of that collinearity condition expression is used, when a camera calibration is already known, external orientation parameters (position and tilting) of a single photograph can be obtained if there are 3 or more reference points. In photogrammetry, 4 or more reference points are used by considering an error at the time of orientation. Each parameters are obtained by the least square method, and error between three-dimensional coordinates obtained from image coordinates and initial reference point is also calculated.

(Step 11) Main measurement is performed on the selected measuring points. The measurement data obtained in the main measurement are associated with the telescopic image together with the horizontal angle and the vertical angle at the measuring points, and are stored in the image storage unit 26 or in the storage unit 23. The measuring points, for which measurement has been completed, are displayed by point display on the panoramic image 31.

(Step 12) It is judged whether or not there is any scheduled measuring point 35 for which the main measurement has not been completed. If found, the remaining scheduled measuring points 35 are selected in order for the object of the next main measurement, and the measurement procedures from Step 07 to Step 11 are repeated.

(Step 13) When the measurement (scanning) has been completed for all of the scheduled measuring points 35 extracted on the panoramic image 31, all points are displayed on the panoramic image 31, and it is checked whether or not there is any lack of the measuring points. The measuring points which has not been measured are recorded in the image storage unit 26 as subsidiary measuring points. The measurement operator may add the subsidiary measuring points by designation on the image.

(Step 14) Further, the subsidiary measuring points are automatically scanned and measured, and the measurement is completed.

As described above, in the measurement according to the present invention, multi-point measurement depending on the purpose of the measurement can be performed. For instance, in the measurement for the preparation of a map, measurement can be performed only for necessary portions and necessary points such as a contour and the like, and the number of measuring points can be extensively reduced. Also, the areas such as sky which was not measurable and causes errors by automatic measurement in the past can be excluded and efficiency of the measurement is improved.

Further, the multi-point automatic measurement can be performed by using a total station. As a result, averaged distance measurement can be carried out on the measuring points, and the measurement data can be acquired with high accuracy.

INDUSTRIAL APPLICABILITY

According to the present invention, there are provided a step of acquiring an image including an object to be measured, a step of extracting feature points on the object to be measured through processing of the image and of setting a scheduled measuring point, a step of acquiring a telescopic image on the scheduled measuring point by scanning the scheduled measuring point, a step of extracting a point corresponding to the scheduled measuring point as a measuring point as a measuring point from the telescopic image, and a step of performing distance measurement on the measuring point. As a result, the number of the measuring points can be extensively reduced, and the time required for measurement can be shortened and the operation procedure for extracting the feature points in post-treatment can be eliminated, and the working load can be shortened.

Also according to the present invention, there are provided a step of setting up a provisional measurement range including an object to be measured, a step of dividing the provisional measurement range and acquiring images by a wide-angle image with wider angle than the telescopic image, and a step of acquiring the panoramic image through synthesis of the wide-angle images. As a result, multi-point measurement in wide range can be performed, and measuring operation on a large object to be measured can be completed by a single measuring operation.

Further, according to the present invention, the scheduled measuring points is obtained by edge processing. As a result, an extraction of the portions which need distance measuring data such as an edge, a corner, etc. i.e. feature point of the image can be carried out.

Also, according to the present invention, density of the scheduled measuring point is selected by setting a threshold for edge processing, or density of the scheduled measuring point is selected by designating a distance between feature points in edge processing. As a result, measurement can be carried out at the optimal density, depending on the circumstances.

Further, according to the present invention, there is provided a step of setting up a main measurement range by connecting outermost contours of the object to be measured based on the feature points. Further, the scanning on the scheduled measuring point is performed for the main measurement range. Thus, the portions, which measurement cannot be made or portions which are not suitable for measurement can be exempted from the measurement. As a result, the time required for the measurement operation is reduced and the efficiency of the measuring operation is improved.

Also, according to the present invention, the distance measurement is an averaged distance measurement obtained through operations at predetermined times at a same measuring point. As a result, distance measurement with high accuracy can be performed.

Further, according to the present invention, the measuring point, which has been measured is displayed on the image. As a result, the conditions of the measurement can be easily identified, and omission of measurement operation can be prevented.

Also, according to the present invention, there are provided a telescope unit having a first image pickup unit for acquiring a wide-angle image and a second image pickup unit for acquiring a telescopic image with higher magnification than the wide-angle image, a distance measuring unit for performing distance measurement by projecting a distance measuring light and by receiving a light reflected from an object to be measured, an angle measuring unit for detecting a horizontal angle and a vertical angle of the telescope unit, a drive unit for rotating and driving the telescope unit in a horizontal direction and in a vertical direction, and a control device for controlling image pickup of the first image pickup unit and the second image pickup unit and for controlling the drive unit based on the results of detection from the angle measuring unit, wherein, the control device synthesizes a panoramic image by connecting the wide-angle image obtained by the first image pickup unit, sets up a scheduled measuring point by edge processing of the wide-angle image, and extracts a measuring point corresponding to the scheduled measuring point in the telescopic image by scanning the scheduled measuring point and acquiring the telescopic image by the second image pickup unit with respect to each scheduled measuring point, and distance measurement is performed on the measuring point. As a result, the number of measuring points is reduced extensively, the time required for measurement is reduced, and the number of operations to extract feature points in post-treatment is reduced. As a result, the operation load can be considerably decreased.

Further, according to the present invention, the control device calculates a horizontal angle and a vertical angle of the measuring point and acquires three-dimensional data of the measuring point. As a result, the acquisition of three-dimensional data for the measuring point is carried out efficiently and the working load is reduced.

Also, according to the present invention, a rectangular provisional measurement range which has a diagonal line where two points are provided is set up by directing the telescope unit to the two separated points. As a result, to set up the provisional measurement range becomes easier.

Further, according to the present invention, the control device sets up a main measurement range by connecting outermost contours of the object to be measured based on feature points in the provisional measurement range and controls the drive unit so that the main measurement range is scanned. Thus, distance measurement operation can be eliminated on the portions, for which measurement cannot be made, or on the portions for which measurement data is not required. As a result, a working efficiency is improved and an an operation time is reduced.

Further, according to the present invention, the distance measuring unit performs distance measurement at required times on a same measuring point and an average value is regarded as the results of distance measurement. As a result, the measurement operation is performed with high accuracy.

The invention claimed is:

1. A multi-point measuring method, characterized by comprising a step of acquiring an image including an object to be measured, a step of extracting feature points on the object to be measured through processing of the image and of setting a scheduled measuring point, a step of acquiring a telescopic image on the scheduled measuring point by scanning over the scheduled measuring point, a step of extracting a point corresponding to the scheduled measuring point as a measuring point from the telescopic image, and a step of performing distance measurement on the measuring point.

2. A multi-point measuring method according to claim 1, wherein said step of acquiring an image including an object to be measured is a step of acquiring a panoramic image of wide range including the object to be measured.

3. A multi-point measuring method according to claim 2, wherein there are provided a step of setting up a provisional measurement range including an object to be measured, a step of dividing the provisional measurement range and acquiring images by a wide-angle image with wider angle than the telescopic image, and a step of acquiring the panoramic image through synthesis of the wide-angle images.

4. A multi-point measuring method according to claim 3, wherein edge processing is performed to the wide-angle image or to a telescopic image, and there is included a step of superimposed the feature points obtained in edge processing on the panoramic image.

5. A multi-point measuring method according to claim 1 or 2, wherein said scheduled measuring point is obtained by edge processing.

6. A multi-point measuring method according to claim 5, wherein density of said scheduled measuring point is selected by setting a threshold in edge processing.

7. A multi-point measuring method according to claim 5, wherein density of said scheduled measuring point is selected by designating a distance between feature points in edge processing.

8. A multi-point measuring method according to claim 1 or 2, wherein there is a step of setting up a main measurement range by connecting outermost contours of the object to be measured based on the feature points.

9. A multi-point measuring method according to claim 8, wherein scanning on the scheduled measuring point is performed for said main measurement range.

10. A multi-point measuring method according to claim 1 or 2, wherein the distance measurement is an averaged distance measurement obtained through operations at predetermined times at a same measuring point.

11. A multi-point measuring method according to claim 1 or 2, wherein the measuring point, which has been measured, is displayed on the image.

12. A surveying device, characterized by comprising a telescope unit having a first image pickup unit for acquiring a wide-angle image and a second image pickup unit for acquiring a telescopic image with higher magnification than the wide-angle image, a distance measuring unit for projecting a distance measuring light and for performing distance measurement by receiving a light reflected from an object to be measured, an angle measuring unit for detecting a horizontal angle and a vertical angle of said telescope unit, a drive unit for rotating and driving said telescope unit in a horizontal direction and in a vertical direction, and a control device for controlling image pickup of said first image pickup unit and said second image pickup unit and for controlling said drive unit based on the results of detection from said angle measuring unit, wherein, said control device synthesizes a panoramic image by connecting the wide-angle image obtained by said first image pickup unit, sets up a scheduled measuring point by edge processing of the wide-angle image, and extracts a measuring point corresponding to the scheduled measuring point in the telescopic image by scanning the scheduled measuring point and acquiring the telescopic image by said second image pickup unit with respect to each scheduled measuring point, and distance measurement is performed on the measuring point.

13. A surveying device according to claim 12, wherein said control device calculates a horizontal angle and a vertical angle of the measuring point and acquires three-dimensional data of the measuring point.

14. A surveying device according to claim 12, wherein a rectangular provisional measurement range which has a diagonal line where two points are provided is set up by directing said telescope unit to the two separated points.

15. A surveying device according to claim 14, wherein said control device sets up a main measurement range by connecting outermost contours of the object to be measured based on feature points in said provisional measurement range and controls said drive unit so that the main measurement range is scanned.

16. A surveying device according to claim 12, wherein said distance measuring unit performs distance measurement at required times on a same measuring point and an average value is regarded as the results of distance measurement.

* * * * *